(12) United States Patent
Jimenez et al.

(10) Patent No.: US 10,334,314 B1
(45) Date of Patent: Jun. 25, 2019

(54) PRELOAD-SUPPORTED CONCURRENT VIDEO STREAM LIMITING

(71) Applicant: HULU, LLC, Santa Monica, CA (US)

(72) Inventors: Douglas Jimenez, Los Angeles, CA (US); Paul Henke, Seattle, WA (US); Yingan Wang, Los Angeles, CA (US)

(73) Assignee: HULU, LLC, Santa Monica, CA (US)

( * ) Notice: Subject to any disclaimer, the term of this patent is extended or adjusted under 35 U.S.C. 154(b) by 0 days.

(21) Appl. No.: 15/852,679

(22) Filed: Dec. 22, 2017

(51) Int. Cl.
| | | |
|---|---|---|
| *H04N 21/44* | (2011.01) | |
| *H04N 21/438* | (2011.01) | |
| *H04N 21/472* | (2011.01) | |
| *H04N 21/442* | (2011.01) | |
| *H04N 21/845* | (2011.01) | |
| *H04N 21/2187* | (2011.01) | |

(52) U.S. Cl.
CPC ..... *H04N 21/4383* (2013.01); *H04N 21/2187* (2013.01); *H04N 21/442* (2013.01); *H04N 21/472* (2013.01); *H04N 21/8456* (2013.01)

(58) Field of Classification Search
None
See application file for complete search history.

(56) References Cited

U.S. PATENT DOCUMENTS

2010/0083268 A1\* 4/2010 Morris ............... G06F 9/526
718/104

OTHER PUBLICATIONS

Adobe Primetime Concurrency Monitoring, 2015.\*
Presentation entitled: "Adobe Primetime Concurrency Monitoring"; 2015; 16 pages; : https://www.dropbox.com/s/swnu7konwdod2s9/2016_07_Primetime%20Concurrency%20Monitoring%20Overview%20and%20Roadmap.pdf?dl=0.
Concurrency Monitoring Introduction; Adobe Primetime Authentication Helpdesk; : http://tve.helpdocsonline.com/concurrency-monitoring-introduction.
Concurrency Monitoring API; Swagger UI; Feb. 2017; 21 pages; https://web.archive.org/web/20170227035247/http://docs.adobeptime.io/cm-api-v2/.

\* cited by examiner

*Primary Examiner* — Cai Y Chen
(74) *Attorney, Agent, or Firm* — Fountainhead Law Group P.C.

(57) ABSTRACT

In one embodiment, a request is received from a user to open a stream for an upcoming second live media program during a time period in which users request a manifest for the upcoming second live media program that will start after a first live media program ends. The method uses a per device stream limit for the user to determine whether to allow the request. A device identifier database is accessed to determine current device identifiers associated with devices that the user is currently using to receive media programs. The method determines whether a device identifier associated with a device that sent the request is found in the current device identifiers. In response to determining that the device identifier for the request is found in the current device identifiers, the request to open the stream is allowed based on determining that the per device stream limit is not violated.

20 Claims, 11 Drawing Sheets

PRELOAD-SUPPORTED CONCURRENT VIDEO STREAM LIMITING

BACKGROUND

Video delivery services may have stream limits for users. A stream may use an open connection that a client device has with either a content delivery network (CDN) or a server associated with the video delivery service. The video delivery service may track the number of streams that a user has concurrently open and then may enforce stream limits. Using stream limits may ensure that users cannot overuse the video delivery service or they may avoid a user sharing the user's account information with other users. Overusing the service may result in delivery bottlenecks or added costs to deliver the videos. Also, sharing the account with other users may attempt to avoid potential new users paying subscription fees to the video delivery service.

When a video delivery service offers a live viewing option in which users can view live media programs on a set linear schedule, enforcing the stream limits may cause problems with a user's experience. In the linear schedule, users can only watch the media programs when they are offered and available in the schedule. At certain times, such as on the half-hour, or hourly, the live schedule may switch from playing a first media program to playing a second media program. For example, on the half hour or hour, multiple media programs may end and new media programs may start. To make the switchover smooth, the video delivery service may allow client devices to preload a new manifest for the second live media program before the first media program ends. That is, before the switchover occurs, a client device may preload a manifest that identifies a number of segments for the second media program. This preloading causes the client device to open a new stream to perform the preloading. However, the opening of the new stream may cause the user to go over the user's stream limit. Accordingly, the video delivery service may block the opening of the stream for preloading. In these cases, the user experience may degrade as the preloading may not happen and when the switchover occurs from the first media program to the second media program, the client device has not opened a stream and preloaded the manifest. The client device may experience some buffering or jitter when the first media program ends while the client device opens a new stream and downloads the manifest files.

DETAILED DESCRIPTION

Figure 1:
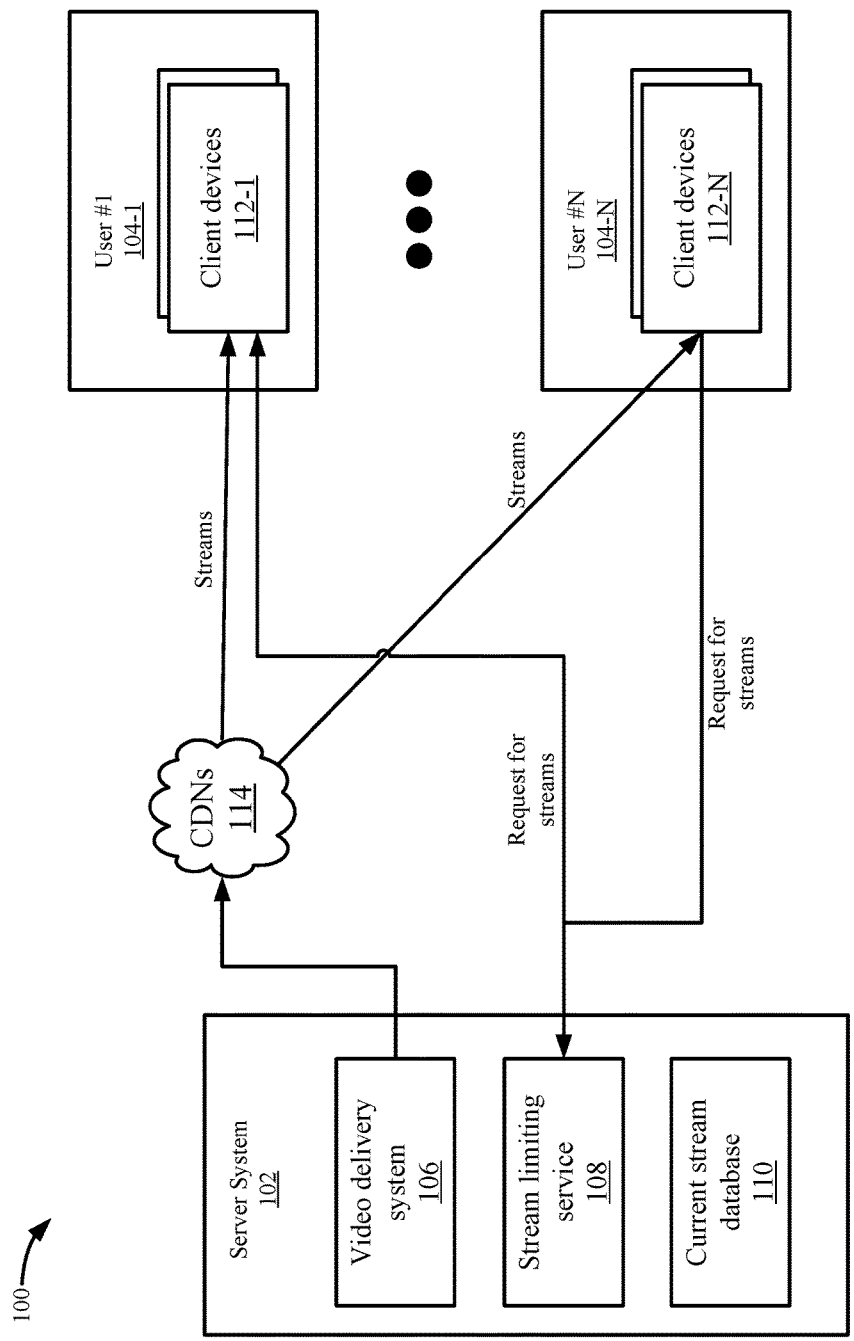
FIG. 1 depicts a simplified system of a method for enforcing stream limits according to some embodiments.

Described herein are techniques for a video delivery system. In the following description, for purposes of explanation, numerous examples and specific details are set forth in order to provide a thorough understanding of some embodiments. Some embodiments as defined by the claims may include some or all of the features in these examples alone or in combination with other features described below, and may further include modifications and equivalents of the features and concepts described herein.

A video delivery service receives a request from a user for an upcoming live stream of a media program. For example, a user may request a manifest for the upcoming live stream of the media program to allow a client device to preload the manifest via a new stream. The request may be received during a time period in which users request manifests for upcoming live streams of media programs. To process the request, the video delivery service may use a per device stream limit for the user to determine whether to allow the request. The per device steam limit may limit the number of devices that have open streams for the user without taking into account the number of streams the user has open. In some embodiments, the video delivery service accesses a database to determine current device identifiers in which the user is currently using to receive media programs. For example, the user may have multiple client devices that have open streams in which media programs are being received.

The video delivery service may determine that the request for the manifest is associated with a device identifier for a device that is already receiving a media program in a stream. In response to determining this, the video delivery service determines that the per device stream limit for the user is not violated and allows the request for the manifest. By enforcing the per device stream limit for the user, the video delivery service may make a quicker determination to allow the request compared to when stream limits are enforced. For example, the video delivery service may access the database and determine the device identifiers. Then, the video delivery service determines whether one of the device identifiers matches the device identifier associated with the request to determine whether to allow the request. In contrast to the stream limits described in the Background, which required the video delivery service to count the number of active streams and then determine whether this new stream is for preloading. However, the video delivery service uses logic that simplifies the determination of whether to allow the request by using a per device stream limit, which may decrease the time to determine whether to allow the request. This may be important during switchover times in which the number of requests increases by a large amount as multiple client devices request preloading for upcoming live media programs. Processing of the requests in an efficient and quick manner is performed using the described method, which may be important when numerous requests are received during a live media program switchover.

System Overview

FIG. 1 depicts a simplified system 100 of a method for enforcing stream limits according to some embodiments. System 100 includes a server system 102 and users 104-1 to 104-N that use client devices 112-1 to 112-N. In one example, a video delivery service may use a video delivery system 106 to coordinate the delivery of media programs to client devices 112 via content delivery networks (CDNs) 114. In some embodiments, CDN 114 may be a separate entity from the video delivery service. However, it will be understood that the video delivery service may have control over CDN 114.

CDN 114 may include one or more servers that deliver media programs to client devices 112 of users 104. For example, a user #1 may have one or more client devices 112-1 that have open streams to view media programs, which may be videos including television programs and movies. In some embodiments, the media programs may include a live programming service, which is offered live on a linear schedule and the live media programs can only be viewed when offered on the linear schedule. In other examples, the video delivery service may offer on-demand media programs that users can request on-demand. Each request may open a stream between CDN 114 and a client device 112 in which the video of the media programs is delivered.

To open a stream, client devices 112 may send requests for media programs to server system 102. In the live programming service, client devices 112 may request a network, such as a news channel that is offering linear programming for news. While client device 112 is viewing the news channel, video delivery system 106 may continually send whichever live media program is live on the network at that time. In contrast, for on demand videos, client devices 112 send a request for an on demand video at any time. To request another on demand video, client devices 112 send another request. For on demand videos, there may be no preloading of manifests because video delivery system 106 does not know which media program will be requested next. However, in some cases, after watching an on-demand media program, a new media program may autostart and that new media program maybe request a stream to preload the manifest for the new media program.

When a request is received, server system 102 may review stream limits for the user to determine whether to allow the request. For example, a stream limiting service 108 may receive requests to open a stream for a media program and stream limiting service 108 determines whether or not the user is authorized to request another stream. For example, stream limiting service 108 may enforce stream limits on users. In some embodiments, the stream limits may have different requirements. For example, stream limiting service 108 may enforce per device stream limits that limit the number of client device instances that have a stream open for the user. In other examples, stream limiting service 108 may enforce per stream limits that limit the user to a maximum number of streams that are open. In some examples, stream limiting service 108 may switch between different policies, such as enforcing a per stream limit policy or enforcing the per device limit policy. In other embodiments, stream limiting service 108 may only use one of the per stream limit policy or per device limit policy in a time period.

To authorize the request, stream limiting service 108 may access a current stream database 110, which stores information for open streams for users. For example, for each user, current stream database 110 may store a list of open streams with device identifiers that identify the associated client device that is using the stream. Stream limiting service 108 accesses information for a user when a request is received and can then enforce the stream limits for the user. For example, if a per device stream limit is being used, stream limiting service 108 may retrieve the device identifiers for the user that currently have open streams and then determine if a device identifier associated with the request is already located in current stream database 110. If the device identifier associated with the request is already located in current stream database 110, then stream limiting service 108 may authorize the request because the stream limit is per device and this current device has already been counted against the per device limits for the user. Thus, no further comparisons need to be made because the per device stream limit is not affected by opening a new stream for a client device that already has a stream open. Also, stream limiting service 108 may not need to calculate the number of devices to compare to the per device limit, which also simplifies the authorization. Although this method of approving the request is described, other calculations may be performed. For example, stream limiting service 108 may count the unique device identifiers for the user and then determine if the per device stream limit is violated.

When stream limiting service 108 approves the request, video delivery system 106 may allow client device 112 to open a new stream with CDN 114. Video delivery system 106 may also send information to allow client device 112 to preload information for the upcoming live media program, such as by sending a manifest for upcoming segments for the upcoming live media program. By preloading the manifest, client device 112 can begin requesting the segments for the media program using the open stream before the media program starts or when the media program starts. Once the switchover to the new live media program occurs, client device 112 can begin playing the new media program. The preloading saves time for client device 112 and provides a better user experience as the user may experience less delay or jitter when the switchover to the new live media program occurs.

The use of the stream limits using the per device limit may be useful when a large amount of requests for streams to preload information for an upcoming live media program are received. When a switchover from a current live media program to an upcoming live media program is about to occur, stream limiting service 108 may receive a large number of requests to open streams to allow the preloading of the manifests. Stream limiting service 108 should process these requests efficiently to allow the streams to be opened for client devices 112 before the switchover occurs. In addition to allowing client devices 112 to open the streams before the switchover occurs, client devices 112 also need time to download the manifest for the upcoming live media program before the switchover occurs. The use of the per device stream limits allows stream limiting service 108 to perform the authorization faster compared to if per stream limits were used. Additionally, as discussed in the Background, using the per stream limits may cause streams to be blocked due to the opening of a stream for preloading even though the user may not be violating the stream limits since the preloading of the manifest is not viewing the stream. That is, the user is not actively viewing a number of media programs that is over the limit; rather, the preloading of the stream is causing the violation.

Open Stream Examples

Figure 2A:
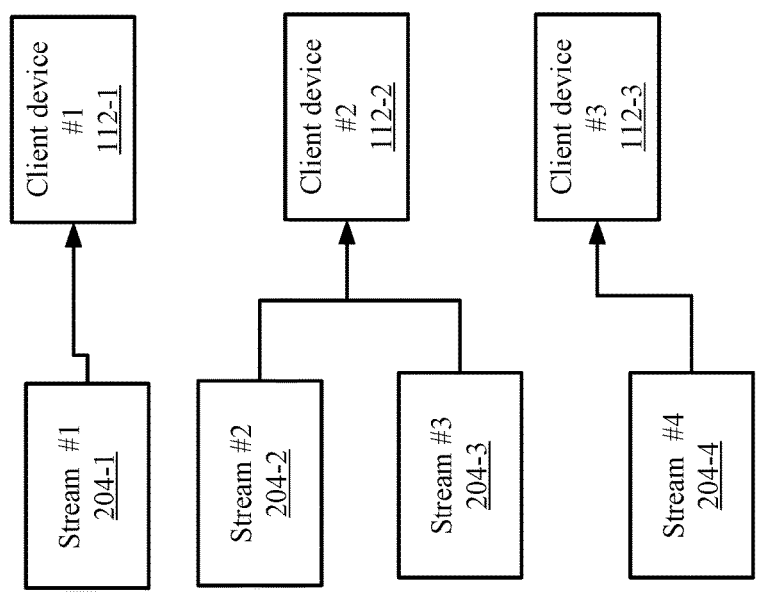
FIG. 2A depicts an example of open streams before a switchover from a current live media program to an upcoming live media program occurs according to some embodiments.

FIG. 2A depicts an example of open streams before a switchover from a current live media program to an upcoming live media program occurs according to some embodiments. A user may be associated with three client devices #1-#3 at 112-1 to 112-3. Client device #1 may have an open stream #1 at 204-1; client device #2 may have two open streams #2 and #3 at 204-2 and 204-3, respectively; and client device #3 may have an open stream #4 at 204-4. In some embodiments, client devices may be associated with different platforms, such as client device #1 may be associated with a game console and client device #3 may be associated with a streaming device. Client device #2 may be associated with a web client that may allow a user to open up multiple media players in multiple tabs of an Internet browser. Accordingly, client device #2 may open multiple streams using the multiple tabs of the Internet browser. In some examples, other types of platforms may allow only one stream to be opened per device, but in other embodiments, one or more platform types may have multiple streams open.

Figure 2B:
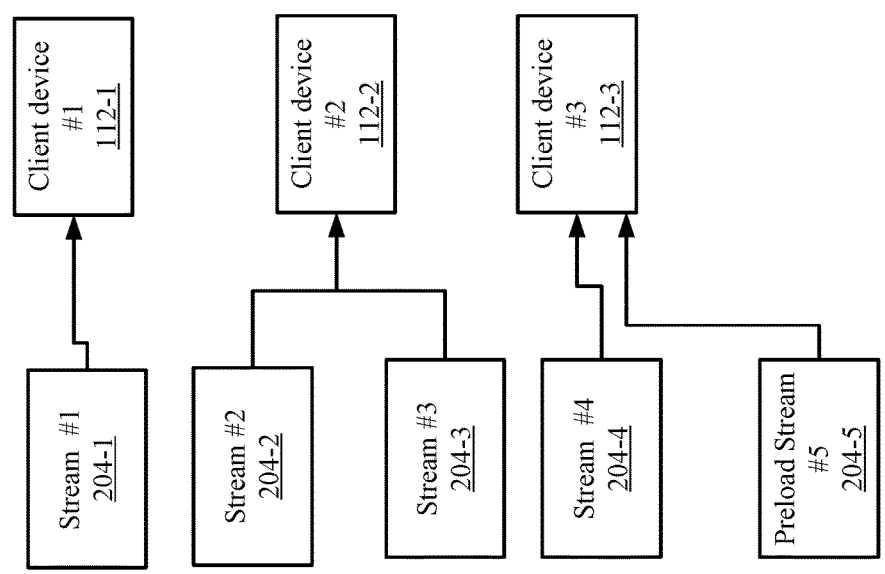
FIG. 2B depicts an example of streams that are opened before a switchover from a current live media program to an upcoming live media program occurs according to some embodiments.

FIG. 2B depicts an example of streams that are opened before a switchover from a current live media program to an upcoming live media program occurs according to some embodiments. Client device #3 has opened a preloaded stream #5 at 204-5. Thus, client device #3 has two streams open. As discussed in the Background, if a user's stream limit is 4, then adding the preloaded stream #5 would violate the user's stream limits and stream limiting service 108 would reject the request for the preloaded stream. However, using a per device limit, stream limiting service 108 allows the preloaded stream to be opened.

Requests During Switchover

Figure 3:
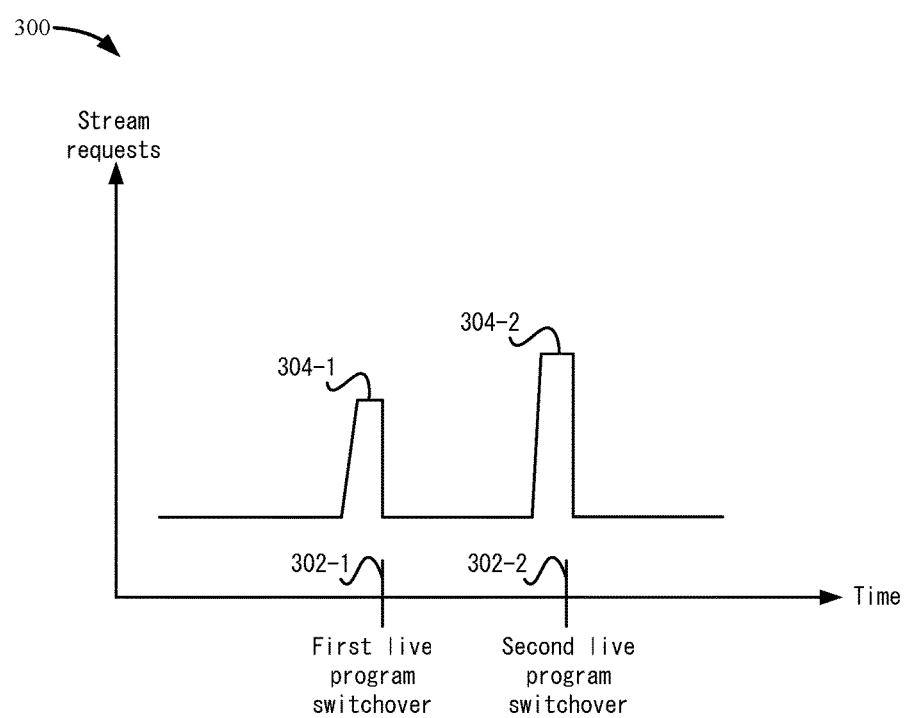
FIG. 3 shows an example of a graph that depicts the stream requests according to some embodiments.

As discussed above, the live media program switchover may result in an increase in requests for streams to open. FIG. 3 shows an example of a graph that depicts the stream requests according to some embodiments. The Y axis of graph 300 is the number of stream requests and the X axis is time.

Before a point 302-1 on graph 300, a first live media program is being offered, such as on a network. At point 302-1, a second live media program replaces the first live media program when the first live media program ends. Similarly, at a point 302-2, the second live media program stops and a third live media program starts.

Before points 302-1 and 302-2, the number of requests for streams dramatically increases. For example, at the first live media program switchover, at 304-1, stream limiting service 108 experiences an increase in stream requests. The increase starts before the first live media program switchover and steadily increases as more client devices 112 send requests. At some point, the requests may continually increase until all client devices 112 that are tuned to the network have sent requests. Then, the requests may drop off. The same increase occurs at a point 304-4 for the second live media program switchover as the requests increase again. At point 304-2, the number of stream requests has increased possibly due to the popularity of the second live media program as more people are watching the network during the second live media program.

As can be seen, the number of stream requests increases greatly in a short period of time before the live media program switchover. Accordingly, processing the stream requests efficiently to allow client devices 112 to open the new streams and request the manifests before the switchover occurs is important during this time period. Stream limiting service 108 may use a per device stream limit to efficiently process the stream requests. In some examples, stream limiting service 108 may switch between different stream limit policies depending on the time period. For example, stream limiting service 108 may switch to the per device stream limit before a live media program switchover. However, after the switchover occurs, stream limiting service 108 may switch to a per stream limit policy. This would allow stream limiting service 108 to process the large amount of stream requests efficiently before the switchover occurs. Then, when a spike in stream limits is not occurring, stream limiting service 108 may enforce the stream limits on a per stream policy. This would allow stream limiting service 108 to detect when users are streaming a large amount of streams from a single device and disallow those requests, but allow flexibility to process a high number of stream requests that occurs on a live media program switchover. Although a switch between per device and per stream limits is described, it will be understood that stream limiting service 108 may only use a per device stream limit.

Stream Limiting Service

Figure 4:
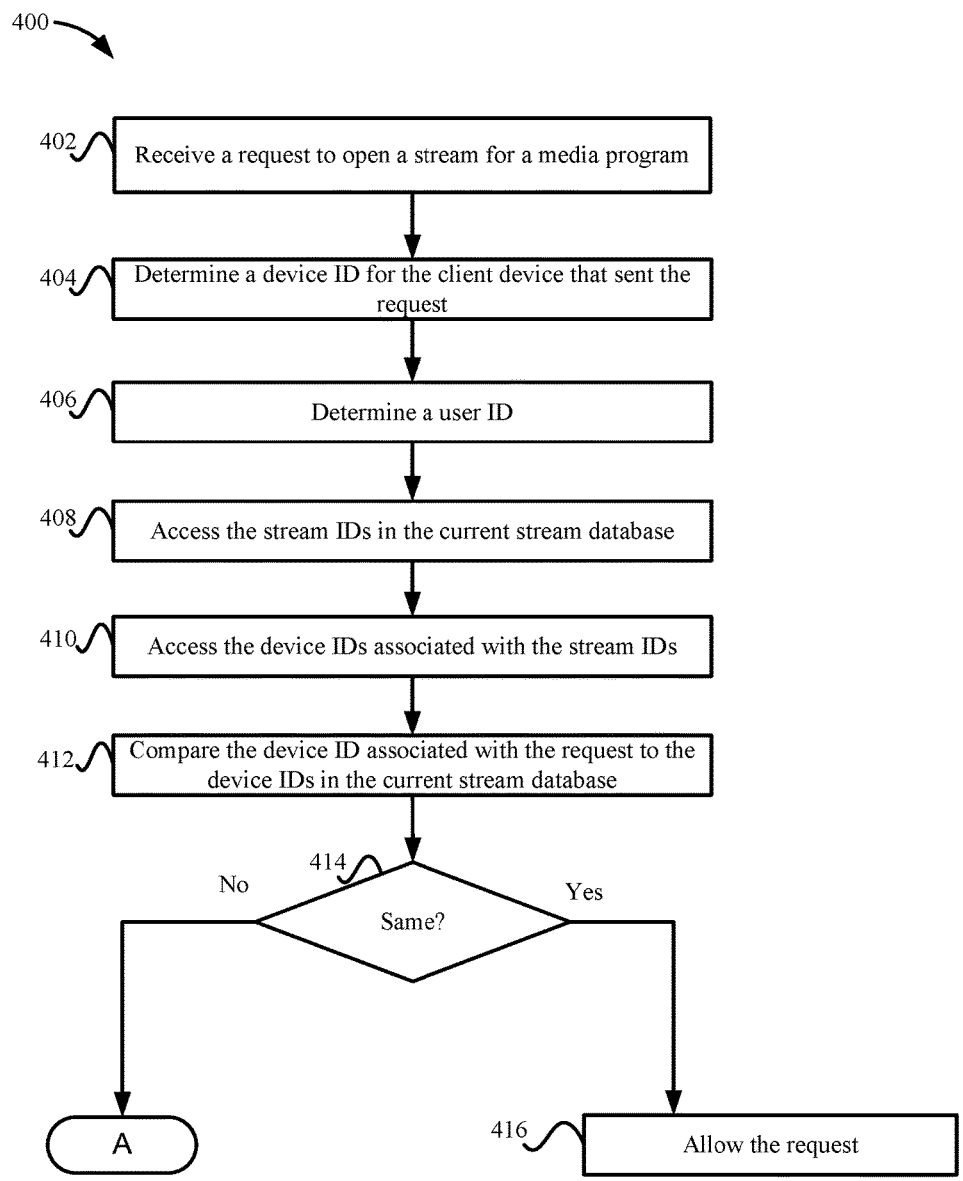
FIG. 4 depicts a simplified flowchart of a method for enforcing stream limits according to some embodiments.

FIG. 4 depicts a simplified flowchart 400 of a method for enforcing stream limits according to some embodiments. At 402, stream limiting service 108 receives a request to open a stream for a media program. In response to the request, stream limiting service 108 may generate a stream identifier (ID) that may uniquely identify the stream and return the stream ID to client device 112. A user cannot have open streams that have the same stream ID. In some embodiments, the request is for a preloading of a manifest for the upcoming live media program. For example, the upcoming live media program is not being offered at the current time. Rather, the user has to wait for the live media program switchover to receive the live media program. However, in some embodiments, stream limiting service 108 does not know if the request is for a live media program that has not started yet; rather, stream limiting service 108 treats the request as any other request to open a stream.

At 404, stream limiting service 108 determines a device ID for the client device that sent the request. The device ID may uniquely identify client device 112 for the user. In some embodiments, client device 112 may generate the device ID and add the device ID to the request.

At 406, stream limiting service 108 determines a user ID for the user account. For example, the user ID is a user name that is associated with the user's account. In some examples, stream limiting service 108 determines the user ID from information in the request. For example, the user ID may be encrypted and embedded in the request. In other examples, stream limiting service 108 may use the device ID and/or the stream ID to determine the user ID via a look-up. For example, stream limiting service 108 uses the device ID and/or stream ID to retrieve the user ID. Or, in other examples, stream limiting service 108 may derive the user ID from the device ID and/or stream ID.

At 408, stream limiting service 108 then accesses the stream IDs for the user in current stream database 110. The stream IDs may be stored as keys under the user ID.

At 410, stream limiting service 108 accesses the device IDs associated with the stream IDs. For example, stream limiting service 108 looks up the entries for the device IDs using the stream IDs. For each stream ID, a device ID associated with a device that has the stream open is stored. For example, the stream IDs may be stored in view data, which is metadata for the stream, and the view data contains the device ID.

At 412, stream limiting service 108 compares the device ID associated with the request to the device IDs in current stream database 110. At 414, stream limiting service 108 determines if the device ID associated with the request matches one of the device IDs in current stream database 110. If so, at 416, stream limiting service 108 allows the request. As discussed above, when a per device stream limit is being enforced, if a user already has a device that has an open stream, then the request for a new stream from that client device 112 would not violate the per device stream limits. Accordingly, stream limiting service 108 may allow the request.

Figure 5:
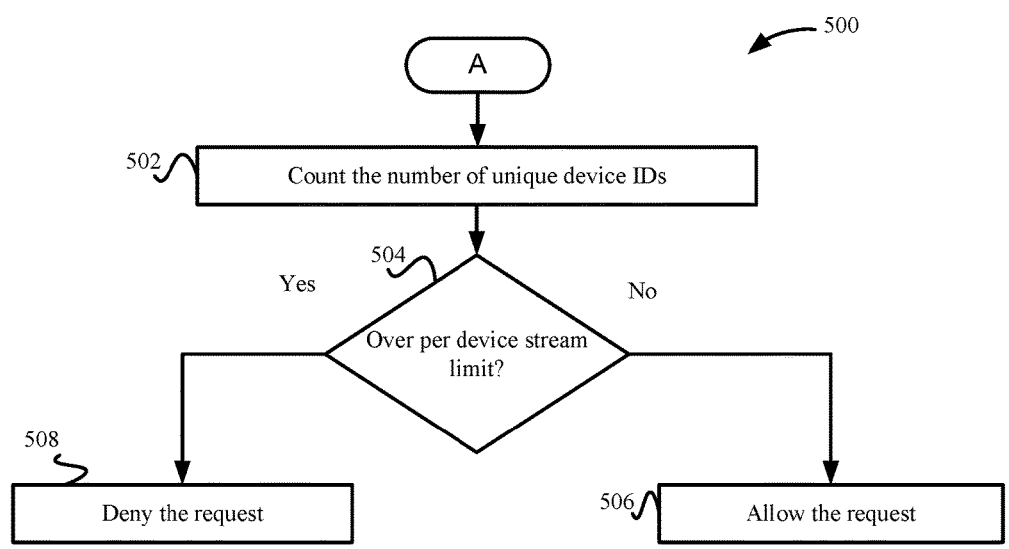
FIG. 5 depicts a simplified flowchart of a method for determining stream limits if a device ID is not the same as a current device ID according to some embodiments.

If the device ID is not found in the device IDs in current stream database 110, then the process proceeds to "A", which is depicted in FIG. 5. FIG. 5 depicts a simplified flowchart 500 of a method for determining stream limits if a device ID is not the same as a current device ID according to some embodiments. At 502, stream limiting service 108 determines how many unique device IDs are associated with the user. The number of unique device IDs would include the current device ID for the request.

At 504, stream limiting service 108 determines if the number of unique device IDs violates (e.g., is above) the per device stream limit. At 506, if the per device stream limit is not violated, then stream limiting service 108 allows the request. For example, the user may only be using two devices and the addition of a third device may not violate the four-device limit. However, at 508, if the user is over the per device stream limit, stream limiting service 108 denies the request. For example, the request may be adding a new client device for the user and adding the new client device violates the device limit. In this example, the request may not be for a preloading of a stream. Rather, the user may be requesting a new stream for a new client device.

Figure 6:
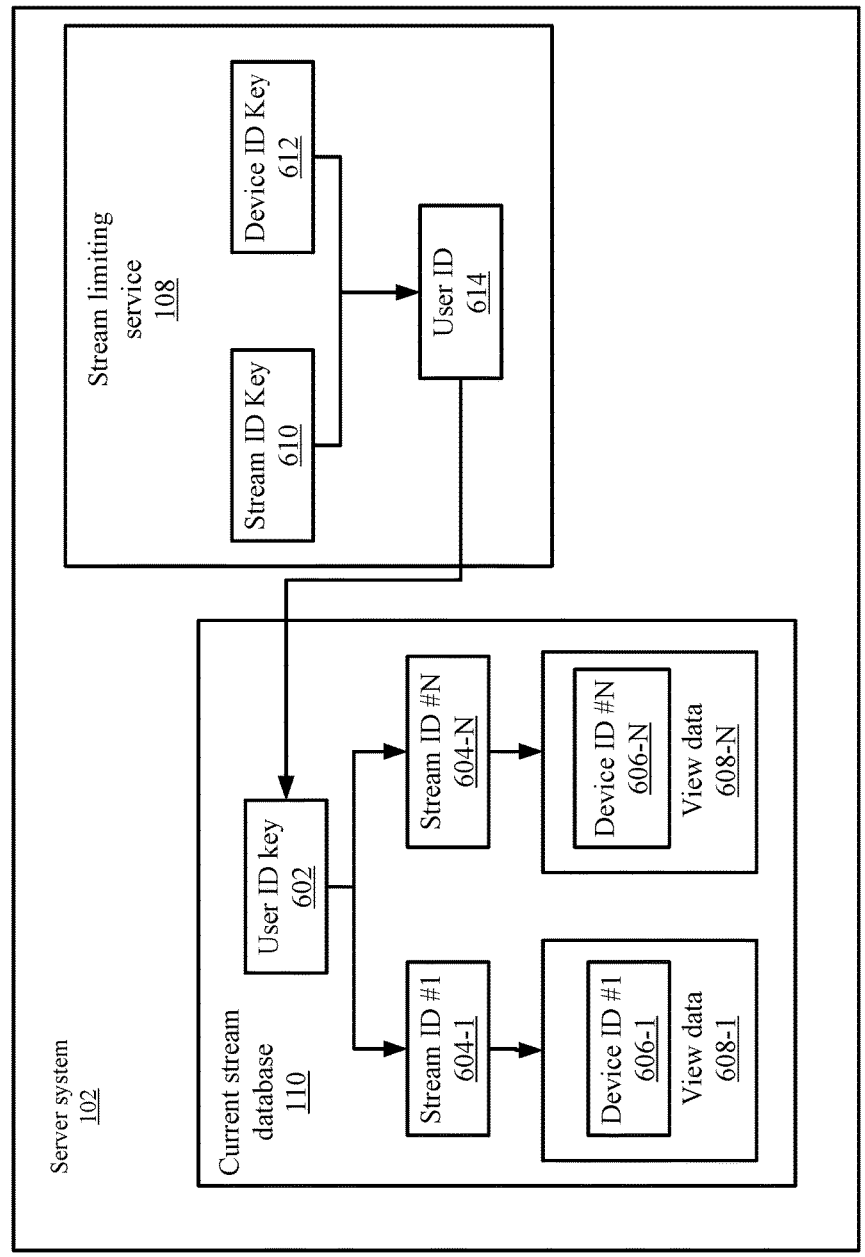
FIG. 6 depicts a more detailed example of stream limiting service and a current stream database according to some embodiments.

As discussed above, the device IDs may be stored in current stream database using the stream IDs. FIG. 6 depicts a more detailed example of stream limiting service 108 and current stream database 110 according to some embodiments. Stream limiting service 108 may receive a stream ID key 610 and a device ID key 612. For example, stream ID key 610 and device ID key 612 may be received in the request. Stream limiting service 108 uses stream ID key 610 and device ID key 612 to look up a user ID 614. For example, the user ID may be an entry associated with one of or a combination of stream ID key 610 and device ID key 612.

Stream limiting service 108 uses user ID 614 to look up a user ID key 602 in current stream database 110. For example, each user ID may be associated with a user ID key in current stream database 110. A single user account may be associated with a single user ID key 602.

User ID key 602 may be associated with one or more stream IDs shown as stream ID #1 to stream ID #N at 604-1 to 604-N. Each stream ID is associated with an open stream for the user. In some embodiments, stream IDs are keys in current stream database 110. Then, view data 608-1 to view data 608-N are linked to the respective keys for the stream IDs. View data may include metadata for each stream, such as a user Internet protocol (IP) address, a location for the user, and authorizations for the user. Additionally, view data includes a device ID for each stream shown as device ID #1 to #N at 606-1 to 606-N. The device ID is the device ID for a client device that opened the stream. As discussed above, devices may have multiple streams open. For example, a device may have multiple streams open when devices are preloading streams. Also, a web client may have multiple streams open. However, in some embodiments, when a web client has multiple streams open, each stream may be assigned a new device ID. For example, each tab is assigned a new device ID. However, in other embodiments, each new tab may be assigned the same device ID. Additionally, picture-in-picture may allow a client device 112 to request multiple streams.

Storing the data in current stream database 110 by user ID key 602 and then by stream IDs may provide efficient storing of the data. For example, when a stream needs to be accessed to update information, the stream may be directly accessed without affecting the other streams. This allows stream limiting service 108 to store the device IDs efficiently in current stream database 110 and also to access the device IDs. For example, stream limiting service 108 may use each stream ID key to retrieve respective device IDs.

Using Different Stream Limits

Figure 7:
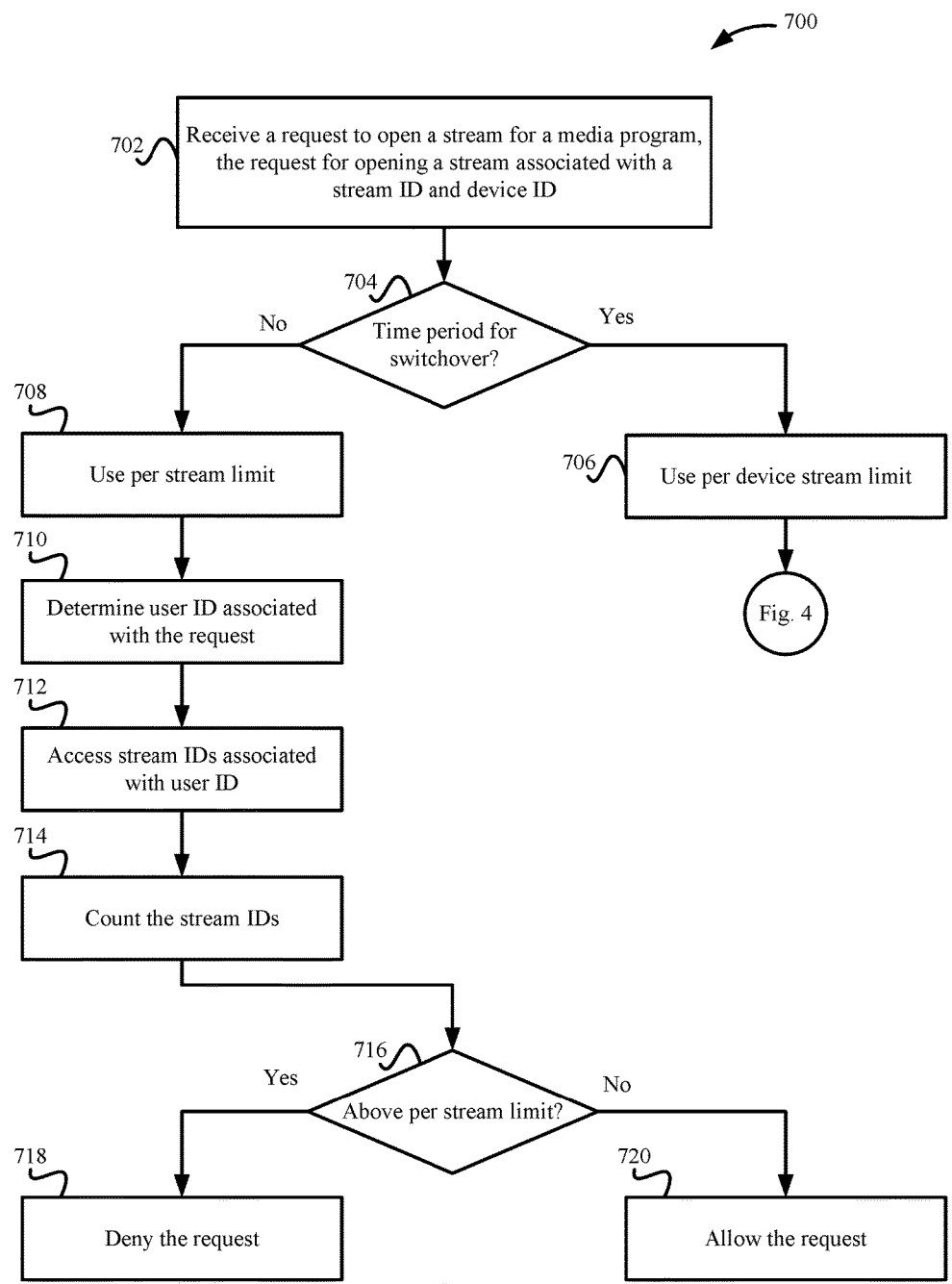
FIG. 7 depicts a simplified flowchart of a method for switching between stream limit policies according to some embodiments.

As discussed above, some embodiments may enforce different stream limits at different times. For example, stream limiting service 108 may enforce a per device stream limit when a switchover of a live media program occurs and may enforce per stream limits when a switchover is not occurring. This allows the video delivery service to efficiently process stream requests during a switchover but enforce per stream limits when the switchover is not occurring. FIG. 7 depicts a simplified flowchart 700 of a method for switching between stream limit policies according to some embodiments. At 702, stream limiting service 108 receives a request to open a stream for a media program. The request is associated with a stream ID and/or a device ID.

At 704, stream limiting service 108 determines if a time period for a live media program switchover is occurring at this time. For example, client devices 112 may be configured to request a preloading of a manifest within a certain time period, such as five minutes before the switchover occurs. The request for preloading manifests may be staggered within this five-minute period. Stream limiting service 108 may determine if a switchover for a network in which the media program is being requested is occurring during this time. If so, at 706, stream limiting service 108 may use the per device stream limit policy. Then, the process proceeds to FIG. 4 as described above.

If the time period for the switchover for a network that is offering the media program is not occurring, then, stream limiting service 108 enforces the per stream limit policy. At 708, stream limiting service 108 uses the per stream limit policy. At 710, stream limiting service 108 determines a user ID associated with the request. At 712, stream limiting service 108 accesses stream IDs associated with the user ID. Stream limiting service 108 may access the stream IDs using the user ID key as discussed above. At 714, stream limiting service 108 then counts the number of stream IDs. The count of the number of stream IDs includes the stream ID that is associated with the request.

At 716, stream limiting service 108 then determines if the number of stream IDs violates the per stream limit. For example, the per stream limit may be four open streams and the number of streams may be three, four, five, etc. If the number of streams is over four, then stream limiting service 108 determines that the number of stream IDs is above the per stream limit and at 718, stream limiting service 108 denies the request. If the number of stream IDs is not above the per stream limit, then at 720, stream limiting service 108 allows the request. The per stream limits may also be enforced per device, such as a device may have a maximum of two streams open at a time. This may allow for preloading of the upcoming live media program without violating the per stream limit.

Figure 8:
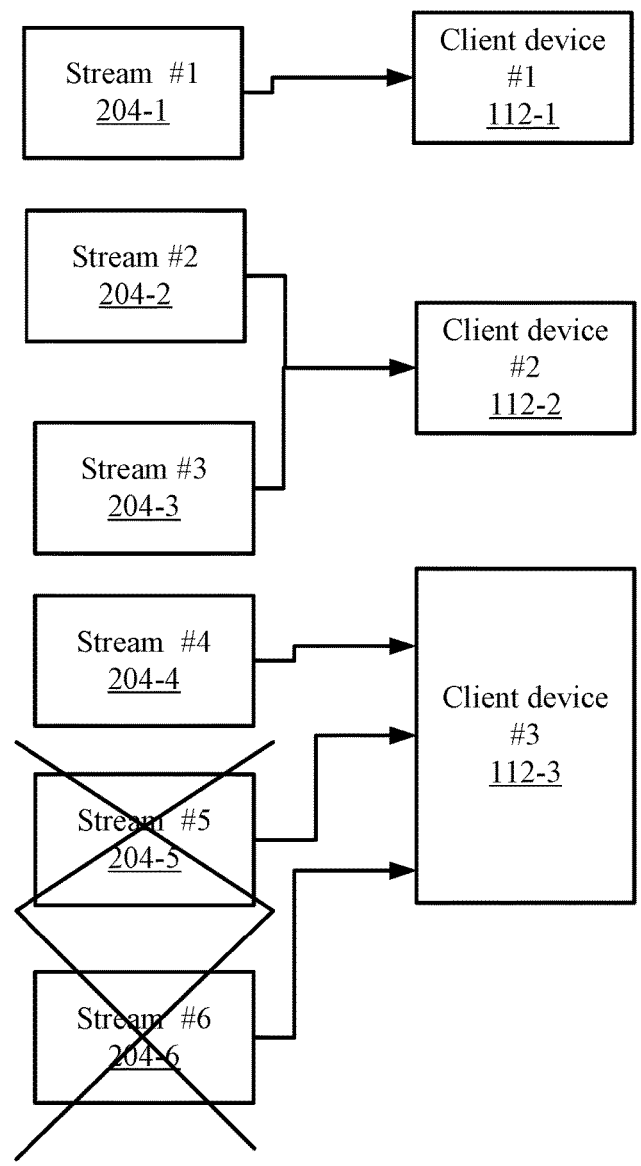
FIG. 8 depicts an example when the per device limits may allow a user to use more streams than desired according to some embodiments.

FIG. 8 depicts an example when the per device limits may allow a user to use more streams than desired according to some embodiments. As shown, a user may have three client devices that have open streams. If a per device limit is enforced, the user may be below a per device limit of four. Accordingly, if a client device #1 requested a preloading of an upcoming live media program, the user would still not violate the per device limit. However, if a stream limit is four streams, it is possible that the user may open a stream #4, stream #5, and stream #6 at 204-4, 204-5, and 204-6, respectively. This would violate the stream limit of four. If the per device stream limits were used, then the video delivery service would be allowing the user to open more streams than desired. However, if stream limiting service 108 enforces the stream limits in times when a switchover is not occurring, then stream limiting service 108 may deny requests for opening stream #5 and stream #6. This allows the video delivery service to enforce stream limits while efficiently processing requests for streams for preloading.

In some embodiments, a client device would have two streams open, one for the preloading and one for a currently active live media program. However, once the switchover occurs, then the stream that was preloading the manifest becomes the active stream. The prior stream that was open would then become inactive as client device 112 would not be requesting any segments on that stream. Previously, if the same stream was used without any preloading, then client device 112 would continue using the same stream. However, because the preloading is being used and starts using the new stream, the video delivery service adjusts the active streams in current stream database 110. In some examples, a client device 112 may send a heartbeat to video delivery system 106. Video delivery system 106 may use a device ID or stream ID to identify the stream. If video delivery system 106 does not receive a heartbeat after a certain time, then video delivery system 106 may remove the stream ID for that stream in which a heartbeat has not been received. In some embodiments, client device 112 sends a heartbeat message periodically, such as every 90 seconds, to video delivery system 106. When a heartbeat is received, video delivery system 106 extends a lifetime for that stream ID by a time period, such as three minutes. During preloading, video delivery system 106 is receiving two heartbeats for two streams from client device 112. When the preloaded stream becomes the active stream, then client device 112 stops sending a heartbeat for the other stream. After the time period elapses, such as after three minutes, video delivery system 106 removes the stream ID from current stream database 110. This accurately keeps track of the number of active streams for a user.

Accordingly, the video delivery service may enforce per stream limits and per device limits. One use of this may be that users may have different requirements in different locations, such as in home and out of home. The use of different stream limits may allow the video delivery service to enforce per stream limits and per device limits. Also, the use of per device limits allows the video delivery service to not have to distinguish between a live media program and a video on-demand media program. For example, when the per device limit is being enforced, stream limiting service 108 counts the number of devices rather than worrying if the stream is associated with a live media program or a video on-demand media program.

Conclusion

Accordingly, stream limiting service 108 may enforce stream limits that allow the efficient processing of stream requests at live media program switchovers. Using the per device stream limit allows stream limiting service 108 to authorize requests quickly, which enables client devices 112 to preload a manifest for upcoming live media programs before the switchover occurs. This enhances the viewing experience for a user as the preloaded manifest and the open stream is used when the switchover occurs thereby avoiding time to open the new stream and load the manifest.

System

Figure 9:
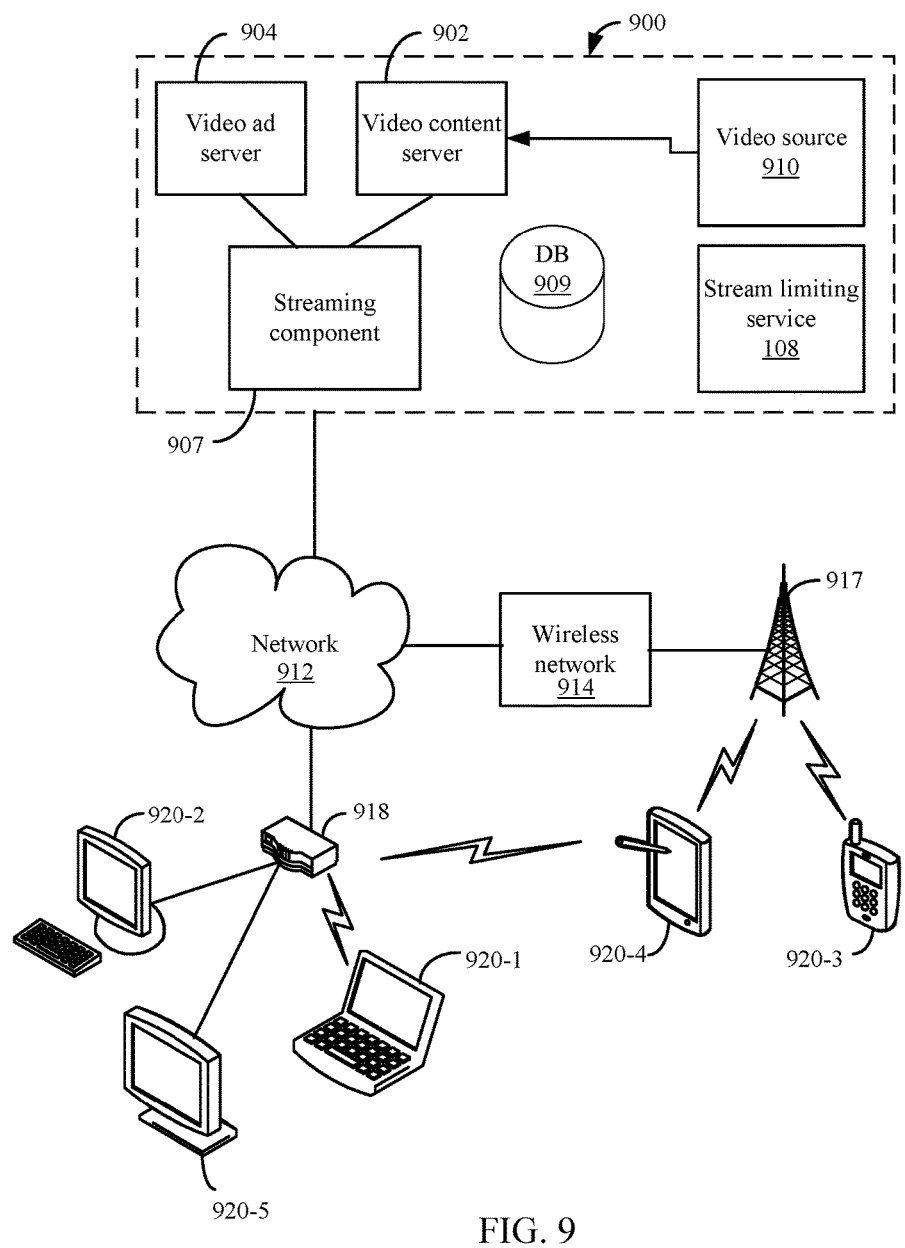
FIG. 9 depicts a video streaming system in communication with multiple client devices via one or more communication networks according to one embodiment.

Features and aspects as disclosed herein may be implemented in conjunction with a video streaming system 900 in communication with multiple client devices via one or more communication networks as shown in FIG. 9. Aspects of the video streaming system 900 are described merely to provide an example of an application for enabling distribution and delivery of content prepared according to the present disclosure. It should be appreciated that the present technology is not limited to streaming video applications, and may be adapted for other applications and delivery mechanisms.

In one embodiment, a media program provider may include a library of media programs. For example, the media programs may be aggregated and provided through a site (e.g., Website), application, or browser. A user can access the media program provider's site or application and request media programs. The user may be limited to requesting only media programs offered by the media program provider.

In system 900, video data may be obtained from one or more sources for example, from a video source 910, for use as input to a video content server 902. The input video data may comprise raw or edited frame-based video data in any suitable digital format, for example, Moving Pictures Experts Group (MPEG)-1, MPEG-2, MPEG-4, VC-1, H.264/Advanced Video Coding (AVC), High Efficiency Video Coding (HEVC), or other format. In an alternative, a video may be provided in a non-digital format and converted to digital format using a scanner and/or transcoder. The input video data may comprise video clips or programs of various types, for example, television episodes, motion pictures, and other content produced as primary content of interest to consumers. The video data may also include audio or only audio may be used.

The video streaming system 900 may include one or more computer servers or modules 902, 904, and/or 907 distributed over one or more computers. Each server 902, 904, 907 may include, or may be operatively coupled to, one or more data stores 909, for example databases, indexes, files, or other data structures. A video content server 902 may access a data store (not shown) of various video segments. The video content server 902 may serve the video segments as directed by a user interface controller communicating with a client device. As used herein, a video segment refers to a definite portion of frame-based video data, such as may be used in a streaming video session to view a television episode, motion picture, recorded live performance, or other video content.

In some embodiments, a video advertising server 904 may access a data store of relatively short videos (e.g., 10 second, 30 second, or 60 second video advertisements) configured as advertising for a particular advertiser or message. The advertising may be provided for an advertiser in exchange for payment of some kind, or may comprise a promotional message for the system 900, a public service message, or some other information. The video advertising server 904 may serve the video advertising segments as directed by a user interface controller (not shown).

The video streaming system 900 also may include stream limiting service 108.

The video streaming system 900 may further include an integration and streaming component 907 that integrates video content and video advertising into a streaming video segment. For example, streaming component 907 may be a content server or streaming media server. A controller (not shown) may determine the selection or configuration of advertising in the streaming video based on any suitable algorithm or process. The video streaming system 900 may include other modules or units not depicted in FIG. 9, for example administrative servers, commerce servers, network infrastructure, advertising selection engines, and so forth.

The video streaming system 900 may connect to a data communication network 912. A data communication network 912 may comprise a local area network (LAN), a wide area network (WAN), for example, the Internet, a telephone network, a wireless cellular telecommunications network (WCS) 914, or some combination of these or similar networks.

One or more client devices 920 may be in communication with the video streaming system 900, via the data communication network 912 and/or other network 914. Such client devices may include, for example, one or more laptop computers 920-1, desktop computers 920-2, "smart" mobile phones 920-3, tablet devices 920-4, network-enabled televisions 920-5, game consoles, streaming sticks, set-top-boxes, or combinations thereof, via a router 918 for a LAN, via a base station 917 for a wireless telephony network 914, or via some other connection. In operation, such client devices 920 may send and receive data or instructions to the system 900, in response to user input received from user input devices or other input. In response, the system 900 may serve video segments and metadata from the data store 909 responsive to selection of media programs to the client devices 920. Client devices 920 may output the video content from the streaming video segment in a media player using a display screen, projector, or other video output device, and receive user input for interacting with the video content.

Distribution of audio-video data may be implemented from streaming component 907 to remote client devices over computer networks, telecommunications networks, and combinations of such networks, using various methods, for example streaming. In streaming, a content server streams audio-video data continuously to a media player component operating at least partly on the client device, which may play the audio-video data concurrently with receiving the streaming data from the server. Although streaming is discussed, other methods of delivery may be used. The media player component may initiate play of the video data immediately after receiving an initial portion of the data from the content provider. Traditional streaming techniques use a single provider delivering a stream of data to a set of end users. High bandwidths and processing power may be required to deliver a single stream to a large audience, and the required bandwidth of the provider may increase as the number of end users increases.

Streaming media can be delivered on-demand or live. Streaming enables immediate playback at any point within the file. End-users may skip through the media file to start playback or change playback to any point in the media file. Hence, the end-user does not need to wait for the file to progressively download. Typically, streaming media is delivered from a few dedicated servers having high bandwidth capabilities via a specialized device that accepts requests for video files, and with information about the format, bandwidth and structure of those files, delivers just the amount of data necessary to play the video, at the rate needed to play it. Streaming media servers may also account for the transmission bandwidth and capabilities of the media player on the destination client. Streaming component 907 may communicate with client device 920 using control messages and data messages to adjust to changing network conditions as the video is played. These control messages can include commands for enabling control functions such as fast forward, fast reverse, pausing, or seeking to a particular part of the file at the client.

Since streaming component 907 transmits video data only as needed and at the rate that is needed, precise control over the number of streams served can be maintained. The viewer will not be able to view high data rate videos over a lower data rate transmission medium. However, streaming media servers (1) provide users random access to the video file, (2) allow monitoring of who is viewing what video programs and how long they are watched, (3) use transmission bandwidth more efficiently, since only the amount of data required to support the viewing experience is transmitted, and (4) the video file is not stored in the viewer's computer, but discarded by the media player, thus allowing more control over the content.

Streaming component 907 may use TCP-based protocols, such as HTTP and Real Time Messaging Protocol (RTMP). Streaming component 907 can also deliver live webcasts and can multicast, which allows more than one client to tune into a single stream, thus saving bandwidth. Streaming media players may not rely on buffering the whole video to provide random access to any point in the media program. Instead, this is accomplished through the use of control messages transmitted from the media player to the streaming media server. Another protocol used for streaming is hypertext transfer protocol (HTTP) live streaming (HLS) or Dynamic Adaptive Streaming over HTTP (DASH). The HLS or DASH protocol delivers video over HTTP via a playlist of small segments that are made available in a variety of bitrates typically from one or more content delivery networks (CDNs). This allows a media player to switch both bitrates and content sources on a segment-by-segment basis. The switching helps compensate for network bandwidth variances and also infrastructure failures that may occur during playback of the video.

The delivery of video content by streaming may be accomplished under a variety of models. In one model, the user pays for the viewing of video programs, for example, using a fee for access to the library of media programs or a portion of restricted media programs, or using a pay-per-view service. In another model widely adopted by broadcast television shortly after its inception, sponsors pay for the presentation of the media program in exchange for the right to present advertisements during or adjacent to the presentation of the program. In some models, advertisements are inserted at predetermined times in a video program, which times may be referred to as "ad slots" or "ad breaks." With streaming video, the media player may be configured so that the client device cannot play the video without also playing predetermined advertisements during the designated ad slots.

Figure 10:
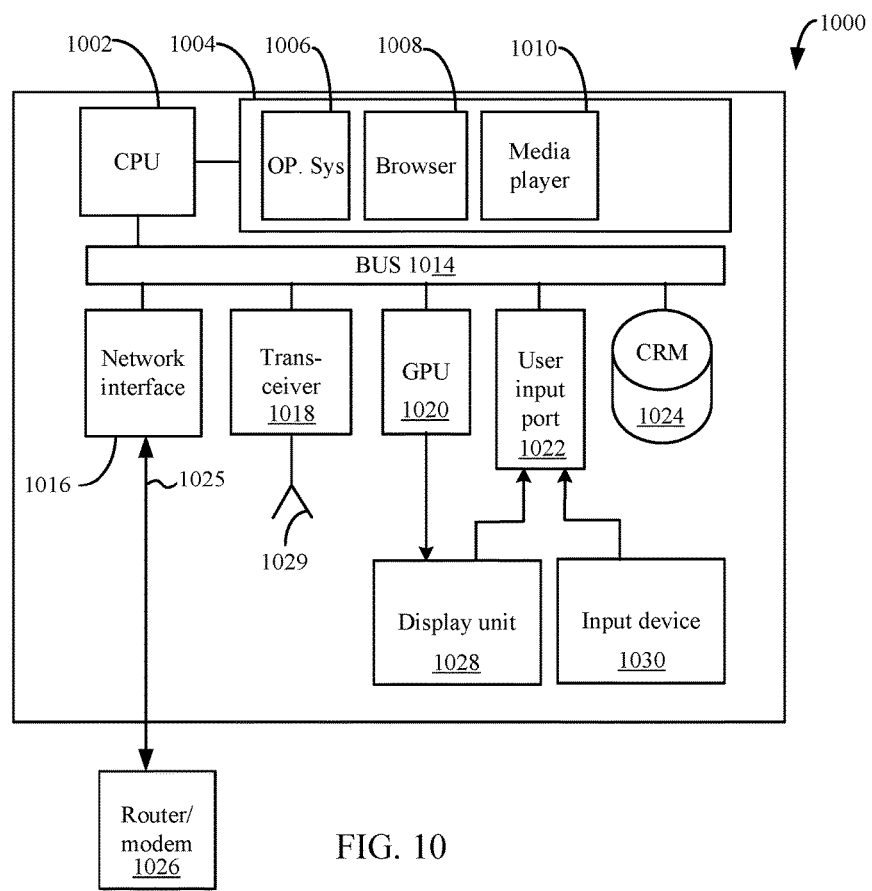
FIG. 10 depicts a diagrammatic view of an apparatus for viewing video content and advertisements.

Referring to FIG. 10, a diagrammatic view of an apparatus 1000 for viewing video content and advertisements is illustrated. In selected embodiments, the apparatus 1000 may include a processor (CPU) 1002 operatively coupled to a processor memory 1004, which holds binary-coded functional modules for execution by the processor 1002. Such functional modules may include an operating system 1006 for handling system functions such as input/output and memory access, a browser 1008 to display web pages, and media player 1010 for playing video. The memory 1004 may hold additional modules not shown in FIG. 10, for example modules for performing other operations described elsewhere herein.

A bus 1014 or other communication component may support communication of information within the apparatus 1000. The processor 1002 may be a specialized or dedicated microprocessor configured to perform particular tasks in accordance with the features and aspects disclosed herein by executing machine-readable software code defining the particular tasks. Processor memory 1004 (e.g., random access memory (RAM) or other dynamic storage device) may be connected to the bus 1014 or directly to the processor 1002, and store information and instructions to be executed by a processor 1002. The memory 1004 may also store temporary variables or other intermediate information during execution of such instructions.

A computer-readable medium (CRM) in a storage device 1024 may be connected to the bus 1014 and store static information and instructions for the processor 1002; for example, the storage device (CRM) 1024 may store the modules 1006, 1008, and 1010 when the apparatus 1000 is powered off, from which the modules may be loaded into the processor memory 1004 when the apparatus 1000 is powered up. The storage device 1024 may include a non-transitory computer-readable storage medium holding information, instructions, or some combination thereof, for example instructions that when executed by the processor 1002, cause the apparatus 1000 to be configured to perform one or more operations of a method as described herein.

A communication interface 1016 may also be connected to the bus 1014. The communication interface 1016 may provide or support two-way data communication between the apparatus 1000 and one or more external devices, e.g., the streaming system 900, optionally via a router/modem 1026 and a wired or wireless connection. In the alternative, or in addition, the apparatus 1000 may include a transceiver 1018 connected to an antenna 1029, through which the apparatus 1000 may communicate wirelessly with a base station for a wireless communication system or with the router/modem 1026. In the alternative, the apparatus 1000 may communicate with a video streaming system 900 via a local area network, virtual private network, or other network. In another alternative, the apparatus 1000 may be incorporated as a module or component of the system 900 and communicate with other components via the bus 1014 or by some other modality.

The apparatus 1000 may be connected (e.g., via the bus 1014 and graphics processing unit 1020) to a display unit 1028. A display 1028 may include any suitable configuration for displaying information to an operator of the apparatus 1000. For example, a display 1028 may include or utilize a liquid crystal display (LCD), touchscreen LCD (e.g., capacitive display), light emitting diode (LED) display, projector, or other display device to present information to a user of the apparatus 1000 in a visual display.

One or more input devices 1030 (e.g., an alphanumeric keyboard, microphone, keypad, remote controller, game controller, camera or camera array) may be connected to the bus 1014 via a user input port 1022 to communicate information and commands to the apparatus 1000. In selected embodiments, an input device 1030 may provide or support control over the positioning of a cursor. Such a cursor control device, also called a pointing device, may be configured as a mouse, a trackball, a track pad, touch screen, cursor direction keys or other device for receiving or tracking physical movement and translating the movement into electrical signals indicating cursor movement. The cursor control device may be incorporated into the display unit 1028, for example using a touch sensitive screen. A cursor control device may communicate direction information and command selections to the processor 1002 and control cursor movement on the display 1028. A cursor control device may have two or more degrees of freedom, for example allowing the device to specify cursor positions in a plane or three-dimensional space.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The computer system may include one or more computing devices. The instructions, when executed by one or more computer processors, may be configured to perform that which is described in particular embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. The above examples and embodiments should not be deemed to be the only embodiments, and are presented to illustrate the flexibility and advantages of particular embodiments as defined by the following claims. Based on the above disclosure and the following claims, other arrangements, embodiments, implementations and equivalents may be employed without departing from the scope hereof as defined by the claims.

What is claimed is:

1. A method comprising:
   receiving, by a computing device, a request to open a second stream for an upcoming second live media program for a user before a first live media program that is currently being streamed on a first stream ends;
   accessing, by the computing device, a device identifier database to determine current device identifiers associated with devices in which the user is currently using to receive media programs;
   determining, by the computing device, whether a device identifier associated with a device that sent the request is found in the current device identifiers to enforce a per device stream limit for the user to determine whether to allow the request to open the second stream; and
   in response to determining that the device identifier for the request is found in the current device identifiers, allowing, by the computing device, the request to open the second stream based on determining that the per device stream limit for the user is not violated.

2. The method of claim 1, wherein the request is for preloading a manifest associated with the upcoming second live media program before the upcoming second live media program starts.

3. The method of claim 1, wherein:
   the second stream is opened for the upcoming second live media program on the device while the first stream is open on the device.

4. The method of claim 2, wherein the upcoming second live media program starts on the second stream by requesting video segments using the preloaded manifest when the first live media program ends on the first stream.

5. The method of claim 1, wherein the request to open the second stream for the upcoming second live media program is allowed before the upcoming second live media program starts.

6. The method of claim 1, wherein the device that sent the request uses the second stream to download a manifest before the upcoming second live media program starts.

7. The method of claim 1, wherein when the upcoming second live media program starts, the device that sent the request uses the second stream to download portions of the upcoming second live media program.

8. The method of claim 1, wherein the per device stream limit enforces a limit of a number of devices that currently have streams that are open for the user.

9. The method of claim 1, wherein determining whether the device identifier associated with the device that sent the request is found in the current device identifiers comprises:
 counting a number of unique devices from a set of the current device identifiers and the device identifier associated with the device that sent the request; and
 comparing the number of unique devices to the per device stream limit.

10. The method of claim 1, wherein determining whether the device identifier associated with the device that sent the request is found in the current device identifiers comprises:
 determining whether the device identifier associated with the device that sent the request is currently stored for the user in the device identifier database.

11. The method of claim 1, further comprising:
 when not in a time period in which users request a manifest for the upcoming second live media program that will start after the first live media program ends, using a per stream limit that limits a maximum number of streams for the user.

12. The method of claim 11, wherein using the per stream limit comprises:
 receiving a subsequent request to open a third stream for another media program;
 determining a number of stream IDs for the user, wherein the number of stream IDs includes the third stream for the subsequent request; and
 comparing the number of stream IDs to the per stream limit.

13. The method of claim 12, wherein using the per stream limit comprises:
 allowing the subsequent request to open the third stream when the number of stream IDs does not violate the per stream limit; and
 not allowing the request to open the third stream when the number of stream IDs violates the per stream limit.

14. The method of claim 1, further comprising:
 in response to determining that the device identifier for the request is not found in the current device identifiers, determining that the per device stream limit for the user is violated when adding the device to the current device identifiers would violate to the per device stream limit and not allowing the request to open the stream.

15. A non-transitory computer-readable storage medium containing instructions, that when executed, control a computer system to be configured for:
 receiving a request to open a second stream for an upcoming second live media program for a user before a first live media program that is currently being streamed on a first stream ends, wherein a same device that requested the second stream has the first stream open;
 accessing a device identifier database to determine current device identifiers associated with devices in which the user is currently using to receive media programs;
 determining whether a device identifier associated with a device that sent the request is found in the current device identifiers to enforce a per device stream limit for the user to determine whether to allow the request to open the second stream; and
 in response to determining that the device identifier for the request is found in the current device identifiers, allowing the request to open the second stream on the same device as the first stream based on determining that the per device stream limit for the user is not violated.

16. The non-transitory computer-readable storage medium of claim 15, wherein the request is for preloading a manifest associated with the upcoming second live media program before the upcoming second live media program starts.

17. The non-transitory computer-readable storage medium of claim 15, wherein:
 the second stream is opened for the upcoming second live media program on the device while the first stream is open on the device.

18. The non-transitory computer-readable storage medium of claim 15, wherein determining whether the device identifier associated with the device that sent the request is found in the current device identifiers comprises:
 counting a number of unique devices from a set of the current device identifiers and the device identifier associated with the device that sent the request; and
 comparing the number of unique devices to the per device stream limit.

19. The non-transitory computer-readable storage medium of claim 15, wherein determining whether the device identifier associated with the device that sent the request is found in the current device identifiers comprises:
 determining whether the device identifier associated with the device that sent the request is currently stored for the user in the device identifier database.

20. An apparatus comprising:
 one or more computer processors; and
 a non-transitory computer-readable storage medium comprising instructions, that when executed, control the one or more computer processors to be configured for:
 receiving a request to open a second stream for an upcoming second live media program for a user before a first live media program that is currently being streamed on a first stream ends, wherein a same device that requested the second stream has the first stream open;
 accessing a device identifier database to determine current device identifiers associated with devices in which the user is currently using to receive media programs;
 determining whether a device identifier associated with a device that sent the request is found in the current device identifiers to enforce a per device stream limit for the user to determine whether to allow the request to open the second stream; and
 in response to determining that the device identifier for the request is found in the current device identifiers, allowing the request to open the second stream on the same device as the first stream based on determining that the per device stream limit for the user is not violated.

\* \* \* \* \*